United States Patent
Al Rashed

(10) Patent No.: US 12,219,352 B2
(45) Date of Patent: Feb. 4, 2025

(54) METHOD OF WIRELESS MONITORING SYSTEM CONNECTION TO DISTRIBUTED CONTROL SYSTEM

(71) Applicant: SAUDI ARABIAN OIL COMPANY, Dhahran (SA)

(72) Inventor: Ibrahim S. Al Rashed, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 210 days.

(21) Appl. No.: 18/059,898

(22) Filed: Nov. 29, 2022

(65) Prior Publication Data
US 2024/0179518 A1 May 30, 2024

(51) Int. Cl.
*H04W 12/06* (2021.01)
*G06F 13/42* (2006.01)
*H04L 9/40* (2022.01)
*H04W 4/38* (2018.01)
*H04W 12/08* (2021.01)
*H04W 84/18* (2009.01)

(52) U.S. Cl.
CPC ........ *H04W 12/06* (2013.01); *G06F 13/4282* (2013.01); *H04L 63/101* (2013.01); *H04W 4/38* (2018.02); *H04W 12/08* (2013.01); *G06F 2213/40* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 4,149,237 A | 4/1979 | Freitas | |
| 4,152,760 A | 5/1979 | Freitas et al. | |
| 6,236,334 B1 | 5/2001 | Tapperson et al. | |
| 2005/0188076 A1* | 8/2005 | Rayburn | H04L 51/04 |
| | | | 709/224 |
| 2010/0074156 A1 | 3/2010 | Tapperson et al. | |
| 2011/0228725 A1* | 9/2011 | Nakamoto | H04L 61/45 |
| | | | 370/328 |
| 2012/0053732 A1* | 3/2012 | Park | G08B 19/005 |
| | | | 709/204 |
| 2015/0082032 A1* | 3/2015 | Bruce | H04L 63/08 |
| | | | 713/168 |
| 2020/0226916 A1* | 7/2020 | Lim | G08B 17/06 |
| 2021/0240179 A1* | 8/2021 | Mallick | H04L 67/01 |
| 2023/0095505 A1* | 3/2023 | Dicosola | G09F 9/30 |
| | | | 701/3 |

* cited by examiner

*Primary Examiner* — Raqiul A Choudhury
(74) *Attorney, Agent, or Firm* — Osha Bergman Watanabe & Burton LLP

(57) ABSTRACT

A method for monitoring point-of-safety stations in a process plant is disclosed. The method includes disposing a wireless gateway device on a roof top of the process plant above a control room of a distributed control system (DCS) in the process plant, disposing wireless field devices on the roof top to form a wireless mesh network, communicatively connecting the wireless gateway device to wired DCS equipment in the control room, communicatively connecting, using at least the wireless mesh network, the wireless gateway device to each of the point-of-safety stations, wirelessly transmitting, via the wireless mesh network, a status signal from each of the point-of-safety stations to the wired DCS equipment, and performing, in response to the wired DCS equipment receiving the status signal, a corrective action to enhance safety of the process plant.

18 Claims, 3 Drawing Sheets

METHOD OF WIRELESS MONITORING SYSTEM CONNECTION TO DISTRIBUTED CONTROL SYSTEM

BACKGROUND

A distributed control system (DCS) is a computerized control system for a process or plant (i.e., a site where the process takes place) where autonomous controllers are distributed throughout the system with no central operator supervisory control. Conventional DCSs uses wired communication technologies and has following disadvantages: (i) control room is far away and requires very long cabling with junction boxes and often incurs ground excavation costs for many controller locations, (ii) system construction and deployment require high level manpower and personnel cost, (iii) current technology is mitigating operation safety compliance, and (iv) limited flexibility for operation requirements. Modern DCSs are becoming more complicated with thousands of instruments, sensors, actuator and controllers to perform the required tasks and functions within the control system. These DCSs have a massive amount of wiring that increases the risk of failure for point to point communication data.

Wireless technology, through its increased utilization, has the possibility to revolutionize the current industry to solve and mitigate existing problems faced by wired solutions. Wireless technology has taken steps forward by introducing a new class of applications; however, wireless systems still face hard utilization where real-time, reliable distributed control operations are concerned.

SUMMARY

In general, in one aspect, the invention related to a method for monitoring point-of-safety stations in a process plant. The method includes disposing a wireless gateway device on a roof top of the process plant above a control room of a distributed control system (DCS) in the process plant, disposing a plurality of wireless field devices on the roof top to form a wireless mesh network, communicatively connecting the wireless gateway device to wired DCS equipment in the control room, communicatively connecting, using at least the wireless mesh network, the wireless gateway device to each of the point-of-safety stations, wirelessly transmitting, via the wireless mesh network, a status signal from each of the point-of-safety stations to the wired DCS equipment, and performing, in response to the wired DCS equipment receiving the status signal, a corrective action to enhance safety of the process plant.

In general, in one aspect, the invention related to a system for monitoring point-of-safety stations in a process plant. The system includes a wireless gateway device disposed on a roof top of the process plant above a control room of a distributed control system (DCS) in the process plant, a plurality of wireless field devices disposed on the roof top to form a wireless mesh network, a wired DCS equipment in the control room and communicatively connected to the wireless gateway device, and the point-of-safety stations that are communicatively connected using at least the wireless mesh network to the wireless gateway device, wherein each of the point-of-safety stations wirelessly transmits, via the wireless mesh network, a status signal to the wired DCS equipment, and wherein the wired DCS equipment facilitates performing, in response to receiving the status signal, a corrective action to enhance safety of the process plant.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein provide a method and a system for a wireless shower monitoring system at a designated building or plant having multiple emergency eyewash/shower points of safety. Throughout this disclosure, the term "plant" or "process plant" refers to a site where a specific process takes place, such as a factory building. The system includes proximity switches and discrete transmitters (DTs) that transfer the eyewash/shower status via a wireless network of multiple field links to a gateway installed in the control room roof top. The gateway communicates the eyewash/shower status with an existing DCS over Modbus TCP/IP communication. Therefore, the eyewash/shower status of multiple emergency eyewash/shower points of safety may be monitored through the existing DCS without wired connections to individual emergency eyewash/shower points. The eyewash/shower status includes use of each eyewash/shower point of safety by plant personnel in an emergency to enable plant safety officers to take necessary precautionary actions. According to one or more embodiments, the wireless shower monitoring system solution is composed of several segments that are connected together to provide a complete solution covering the need for online shower monitoring.

Figure 1:
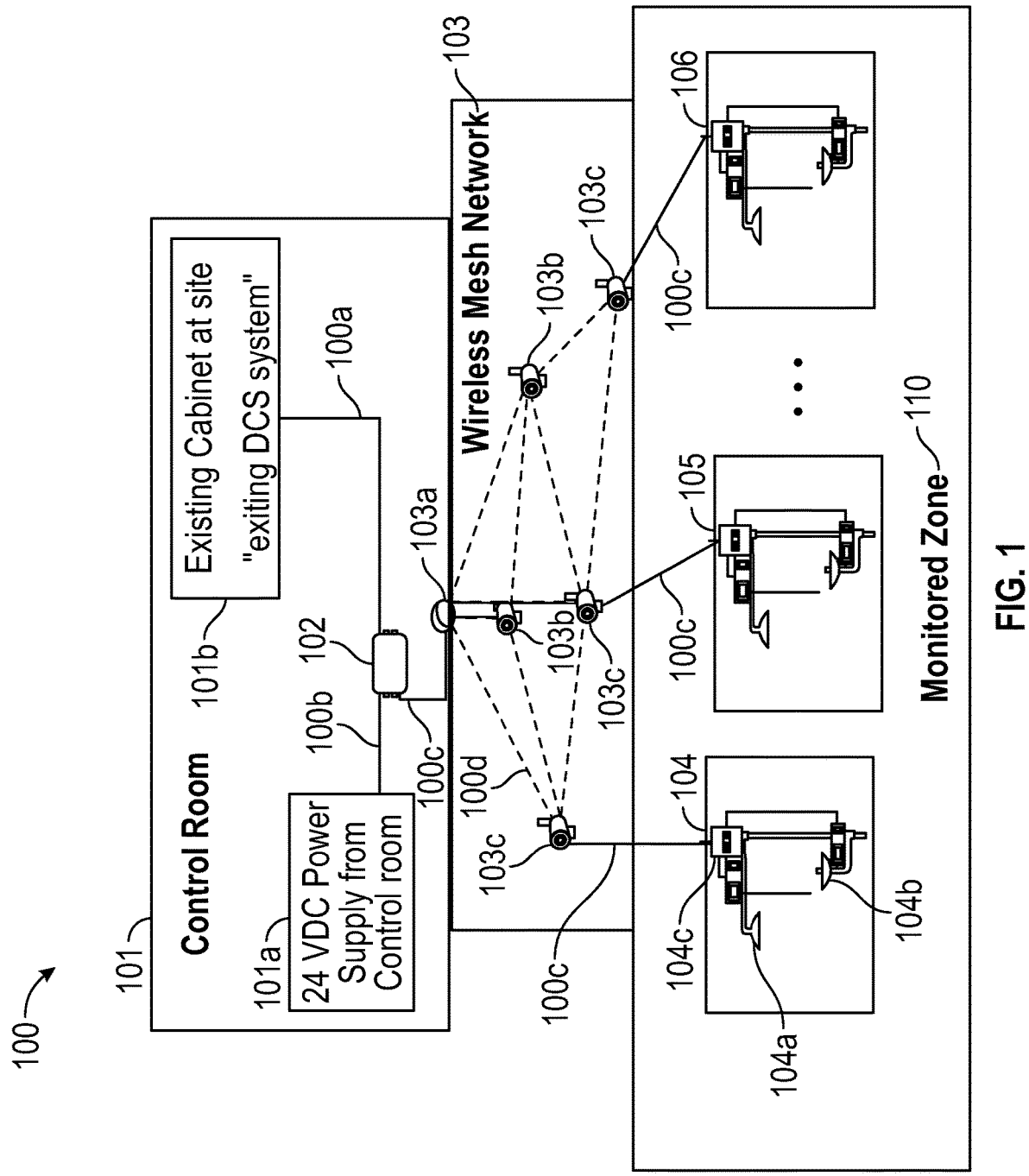
FIG. 1 shows a system in accordance with one or more embodiments.

Turning to FIG. 1, FIG. 1 shows a schematic diagram in accordance with one or more embodiments. As shown in FIG. 1, the distributed control system (DCS) (100) is a eyewash/shower monitoring system including a control room (101) and a wireless mesh network (103) to collectively provide a complete solution covering the need for online eyewash/shower monitoring of a plant.

The control room (101) is part of a conventional DCS of the plant and is modified to include a wireless gateway (102). In particular, the wireless gateway (102) receives electrical power from a 24 volt DC power supply in the control room (101) and communicates with conventional wired DCS equipment (101b) in an equipment cabinet via an industrial control communication protocol, such as the Modbus TCP/IP protocol. Modbus is a data communications protocol that has become a defacto standard communication protocol and is now a commonly available means of connecting industrial electronic devices. The wired DCS equipment (101b) is a distributed control system that is utilized to connect any instrument/device (referred to as a field instrument or field device) to be controlled/managed in the plant. The wired DCS equipment (101b) provides field indications (e.g., alarm or other message) to be presented by the user interface of the field instruments/devices.

In one or more embodiments, the wireless gateway (102) supports the Highway Addressable Remote Transducer (HART) communication protocol for the wireless mesh network (103) and uses a wireless antenna (103a) to communicate with wireless field devices (103b) of the wireless mesh network (103). The HART communication protocol is a hybrid analog and digital industrial automation open protocol. The HART protocol allows communication over legacy 4-20 mA analog instrumentation current loops, sharing the pair of wires used by the analog-only host systems. HART is widely used in process and instrumentation systems ranging from small automation applications up to highly sophisticated industrial applications.

The wireless mesh network (103) includes wireless field devices (103b, 103c) communicating with each other in a mesh topology. The wireless field devices are devices that transmit wireless signals in the wireless mesh network (103), such as wireless repeaters, transmitters, transceivers, antennas, etc. In one or more embodiments, the wireless field devices (103b, 103c) communicate with each other in the mesh topology using the HART communication protocol via wireless links represented as dash lines (e.g., dash line (100d)). The wireless communication may use AES-128 encryption (NIST/IEEE compliant). Each field device is assigned a network ID and joint key that are configured in the gateway (102). All field devices in the mesh topology are authenticated; therefore, rogue devices are prevented from joining the HART network. A sophisticated join key is used for each field device by creating an access control list at the wireless gateway (102). Additionally, field devices have unique identities controlled and maintained by wireless gateway (102). Wireless HART network also provides on demand or automatic key rotation, which is managed via a gateway interface. Within the wireless mesh network (103), each field device (103b) acts as a wireless signal repeater while each field device (103c) acts as a discrete transmitter (DT).

The monitored zone (110) is part of the plant where multiple eyewash/shower stations (e.g., 104, 105, 106, etc.) are disposed over a large area in the plant. The monitored zone (110) and the control room (101) may be in a same building of the plant or in different buildings in the plant. Each eyewash/shower station includes a safety shower and an eyewash fountain for flushing toxic or otherwise dangerous material off a person during an emergency incidence in the plant. For example, the eyewash/shower station (104) includes a safety shower (104a) and an eyewash fountain (104b) that are activated/de-activated or otherwise controlled by a station controller (104c). In one or more embodiments, the station controller (104c) may be implemented by hardware, software, or a combination thereof. In one or more embodiments, the station controller (104c) includes a proximity switch that detects a person within a proximity of the eyewash/shower station (104) and automatically turns on the safety shower (104a) and eyewash fountain (104b). When the person moves away from the eyewash/shower station (104), the proximity switch (104c) detects that no person is present within the proximity and automatically turns off the safety shower (104a) and eyewash fountain (104b).

As shown in FIG. 1, each eyewash/shower station is wired to a discrete transmitter (DT) of the wireless network (103) using a 2-pair cable. Twisted pair cabling is a type of wiring in which two conductors of a single circuit are twisted together for the purposes of improving electromagnetic compatibility. The twisted pair cable is also referred to as a two pair cable or 2-pair cable. For example, a 2-pair cable (102c) is routed from a DT (103c) to a local junction box on the station controller (104c). In one or more embodiments, each DT (103c) is located above a corresponding station controller and on the roof top of the building where the eyewash/shower stations (e.g., 104, 105, 106, etc.) are located. Each DT (103c) incudes a circuit that converts switch status signal of a proximity switch in the corresponding station controller into wireless status signal to be sent to the gateway (102) by field links (e.g., 100d).

In one or more embodiments, the wireless field devices (103b), the DTs (103c), and the gateway (102) are installed on the same control room roof top of the control room (101). Accordingly, the proximity switch on/off status is converted into wireless signal and transmitted by the DTs (103) to the gateway (102) via the field devices (103b) and further transmitted to the conventional DCS equipment (101b) using the Modbus TCP/IP protocol.

In one or more embodiments, the gateway/DCS integration is implemented through special software that provides secured signal communication between the wireless HART system and the DCS (100). Upon wireless monitoring system deployment, the safety personnel of the plant can remotely monitor any activation status of eyewash/shower station through automated notifications generated by field level switches indicators of the DCS (100).

Figure 3:
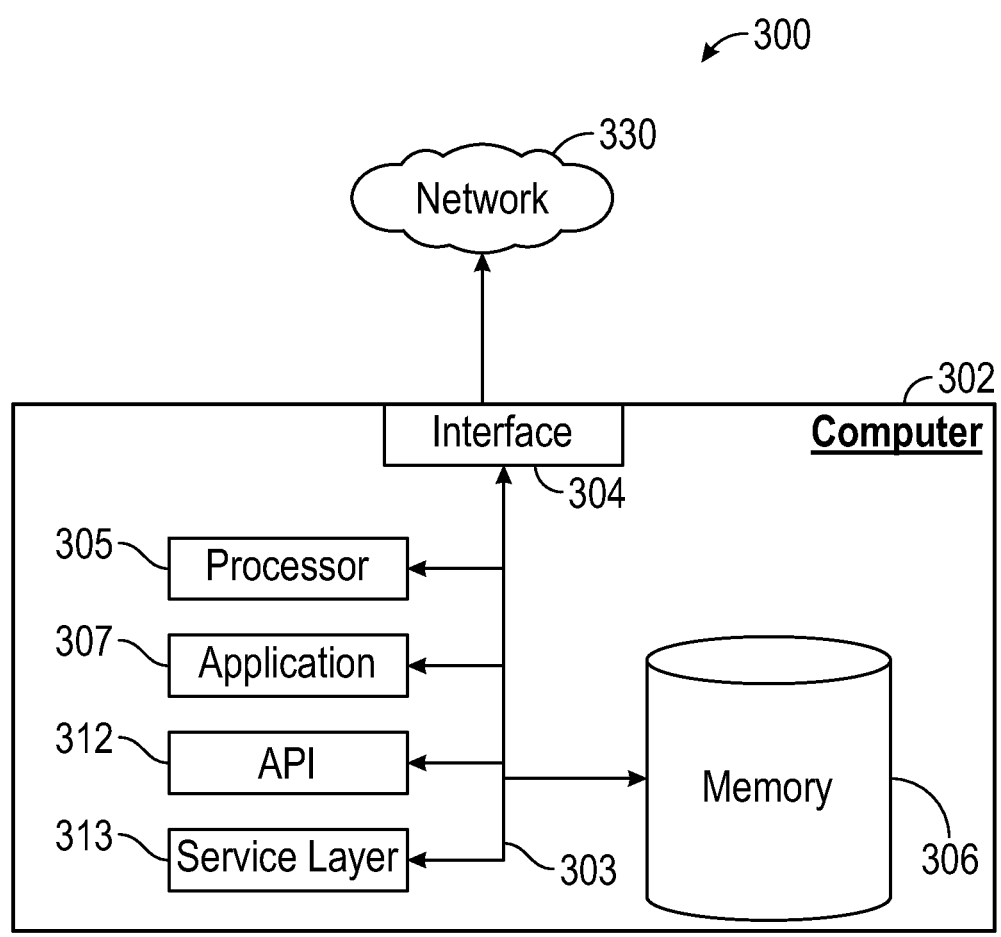
FIG. 3 shows a computing system in accordance with one or more embodiments.

In one or more embodiments, one or more components (e.g., conventional wired DCS equipment, gateway, wireless repeater, station controller, etc.) of the DCS (100) are implemented using a computing device described in FIG. 3 below.

Figure 2:
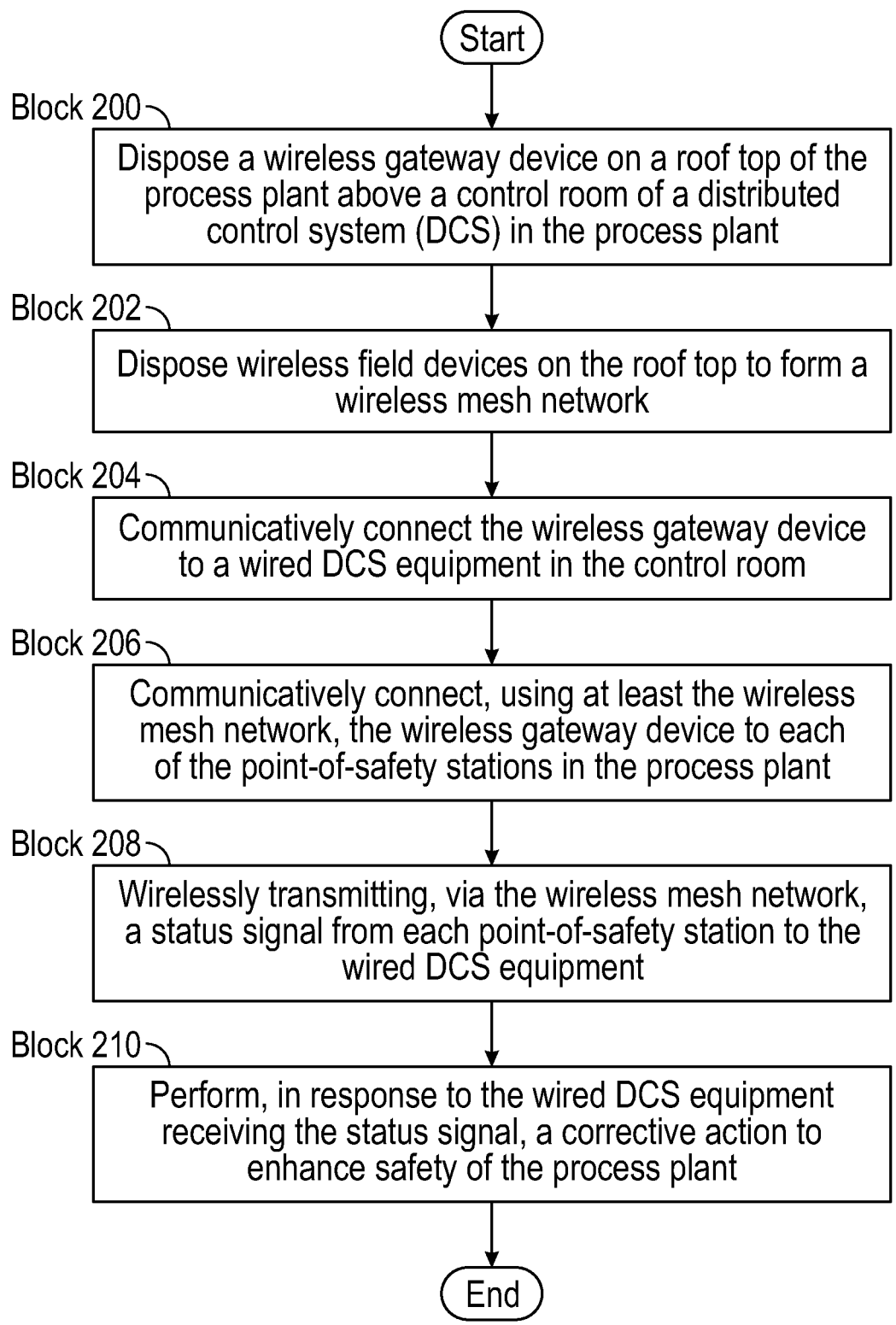
FIG. 2 shows a flowchart in accordance with one or more embodiments.

Turning to FIG. 2, FIG. 2 shows a flowchart in accordance with one or more embodiments. Specifically, FIG. 2 describes a method for monitoring point-of-safety stations in a process plant. In one or more embodiments, the point-of-safety stations include eyewash/shower stations in a monitored zone. One or more blocks in FIG. 2 may be performed using one or more components as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially in Block 200, a wireless gateway device is disposed on a roof top of the process plant above a control room of a distributed control system (DCS) in the process plant.

In Block 202, a number of wireless field devices are disposed on the roof top to form a wireless mesh network. In one or more embodiments, the wireless field devices communicate with each other based on a Highway Addressable Remote Transducer (HART) communication protocol or other filed communication protocols such as foundation field bus (FF), process field bus (Profibus), and Modbus protocols. In one or more embodiments, forming the wireless mesh network includes assigning a network ID and joint key to each of the wireless field devices, authenticating the wireless field devices to exclude any rogue device from the wireless mesh network, and creating an access control list for the wireless gateway device. In one or more embodiments, forming the wireless mesh network includes providing, by the wireless gateway device, on demand or automatic key rotation for the wireless field devices.

In Block 204, the wireless gateway device is communicatively connected to wired DCS equipment in the control room. In one or more embodiments, the wireless gateway device is communicatively connected to the wired DCS equipment based on a Modbus data communications protocol.

In Block 206, the wireless gateway device is communicatively connected to each of the point-of-safety stations using the wireless mesh network and a 2-pair cable to connect a discrete transmitter of the wireless field devices to a station controller of a corresponding point-of-safety station. In one or more embodiments, the discrete transmitter is disposed on the roof top above the corresponding point-of-safety station so as to minimize or otherwise reduce the length of the 2-pair cable.

In Block 208, a status signal is wirelessly transmitted from each of the point-of-safety stations to the wired DCS equipment via the wireless mesh network. In one or more embodiments, the status signal represents whether a person is detected within a pre-determined the point-of-safety station. For example, the point-of-safety station may include a proximity sensor to detect whether a person is nearby. Using this status signal, the operator station personnel can easily manage to remotely monitor any point-of-safety stations being activated through automated notifications generated by the field level switches indicators.

In Block 210, in response to the wired DCS equipment receiving the status signal, a corrective action is performed to enhance safety of the process plant. For example, the corrective action may include shutting down one or more processing steps of the process plant to mitigate a chemical leak incidence.

In one or more embodiments, the station controller includes a proximity switch to detect a person within a pre-determined range of the point-of-safety station, where the 2-pair cable connects the discrete transmitter to a corresponding proximity switch. In particular, the status signal represents an on/off status of the proximity switch, and the discrete transmitter converts the on/off status of the proximity switch into the status signal in a wireless format.

In one or more embodiments, the point-of-safety station includes an eyewash and a shower. In response to detecting the person within the pre-determined range of the point-of-safety station, the proximity switch activates the eyewash and the shower to rinse off dangerous material from the person in an emergency incidence. Accordingly, the corrective action is performed to mitigate the emergency incidence. For example, the corrective action may include shutting down one or more processing steps of the plant to mitigate a chemical leak incidence.

Embodiments use wireless solution in industrial application to increase the mobility and coverage over large zones, eliminate expense and maintenance required by conventional cable, achieve fast and reliable installation and deployment, and ensure personnel safety and obtain flexible human interface. Wireless technology provides cost saving compared to traditional wired monitoring. Further, embodiments disclosed herein provide the following advantages: the ability to monitor activation of safety eyewash/shower stations remotely; automatic recording of periodic maintenance checks; reduction of safety risks to operations and personnel present in wired and in-person monitoring; decreases potential environmental issues; reduction of inventory inspections with benefits of timely and efficient data collection with improved data accuracy; real time monitoring to support corrective actions for enhanced safety; ability for external personnel to aid the operations remotely; shortened contact time with higher efficiency; and real time decision making to achieve maximum efficiency and safety.

By deploying the Safety Shower & Eye Wash wireless monitoring system as disclosed herein, the safety team will have fast and reliable access response ahead of time in resolving incidents and usability in incident reporting and safety compliance audits.

Embodiments may be implemented on a computing device. FIG. 3 depicts a block diagram of a computing device (300) including a computer (302) used to provide computational functionalities associated with described machine learning networks, algorithms, methods, functions, processes, flows, and procedures as described in this disclosure, according to one or more embodiments. The illustrated computer (302) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (302) may include a computer that includes an input device, such as a keypad, keyboard, touch screen, or other device that can accept user information, and an output device that conveys information associated with the operation of the computer (302), including digital data, visual, or audio information (or a combination of information), or a GUI.

The computer (302) can serve in a role as a client, network component, a server, a database or other persistency, or any other component (or a combination of roles) of a computer system for performing the subject matter described in the instant disclosure. The illustrated computer (302) is communicably coupled with a network (330). In some implementations, one or more components of the computer (302) may be configured to operate within environments, including cloud-computing-based, local, global, or other environment (or a combination of environments).

At a high level, the computer (302) is an electronic computing device operable to receive, transmit, process, store, or manage data and information associated with the described subject matter. According to some implementations, the computer (302) may also include or be communicably coupled with an application server, e-mail server, web server, caching server, streaming data server, business intelligence (BI) server, or other server (or a combination of servers).

The computer (302) can receive requests over network (330) from a client application (for example, executing on another computer (302)) and responding to the received requests by processing the said requests in an appropriate software application. In addition, requests may also be sent to the computer (302) from internal users (for example, from a command console or by other appropriate access method), external or third-parties, other automated applications, as well as any other appropriate entities, individuals, systems, or computers.

Each of the components of the computer (302) can communicate using a system bus (303). In some implementations, any or all of the components of the computer (302), both hardware or software (or a combination of hardware and software), may interface with each other or the interface (304) (or a combination of both) over the system bus (303) using an application programming interface (API) (312) or a service layer (313) (or a combination of the API (312) and service layer (313). The API (312) may include specifications for routines, data structures, and object classes. The API (312) may be either computer-language independent or dependent and refer to a complete interface, a single function, or even a set of APIs. The service layer (313) provides software services to the computer (302) or other components (whether or not illustrated) that are communicably coupled to the computer (302). The functionality of the computer (302) may be accessible for all service consumers using this service layer. Software services, such as those provided by the service layer (313), provide reusable, defined business functionalities through a defined interface. For example, the interface may be software written in JAVA, C++, or other suitable language providing data in extensible markup language (XML) format or another suitable format. While illustrated as an integrated component of the computer (302), alternative implementations may illustrate the API (312) or the service layer (313) as stand-alone components in relation to other components of the computer (302) or other components (whether or not illustrated) that are communicably coupled to the computer (302). Moreover, any or all parts of the API (312) or the service layer (313) may be implemented as child or sub-modules of another software module, enterprise application, or hardware module without departing from the scope of this disclosure.

The computer (302) includes an interface (304). Although illustrated as a single interface (304) in FIG. 3, two or more interfaces (304) may be used according to particular needs, desires, or particular implementations of the computer (302). The interface (304) is used by the computer (302) for communicating with other systems in a distributed environment that are connected to the network (330). Generally, the interface (304) includes logic encoded in software or hardware (or a combination of software and hardware) and operable to communicate with the network (330). More specifically, the interface (304) may include software supporting one or more communication protocols, such as the Wellsite Information Transfer Specification (WITS) protocol, associated with communications such that the network (330) or interface's hardware is operable to communicate physical signals within and outside of the illustrated computer (302).

The computer (302) includes at least one computer processor (305). Although illustrated as a single computer processor (305) in FIG. 3, two or more processors may be used according to particular needs, desires, or particular implementations of the computer (302). Generally, the computer processor (305) executes instructions and manipulates data to perform the operations of the computer (302) and any algorithms, methods, functions, processes, flows, and procedures as described in the instant disclosure.

The computer (302) also includes a memory (306) that holds data for the computer (302) or other components (or a combination of both) that can be connected to the network (330). For example, memory (306) can be a database storing data consistent with this disclosure. Although illustrated as a single memory (306) in FIG. 3, two or more memories may be used according to particular needs, desires, or particular implementations of the computer (302) and the described functionality. While memory (306) is illustrated as an integral component of the computer (302), in alternative implementations, memory (306) can be external to the computer (302).

The application (307) is an algorithmic software engine providing functionality according to particular needs, desires, or particular implementations of the computer (302), particularly with respect to functionality described in this disclosure. For example, application (307) can serve as one or more components, modules, applications, etc. Further, although illustrated as a single application (307), the application (307) may be implemented as multiple applications (307) on the computer (302). In addition, although illustrated as integral to the computer (302), in alternative implementations, the application (307) can be external to the computer (302).

There may be any number of computers (302) associated with, or external to, a computer system containing a computer (302), wherein each computer (302) communicates over network (330). Further, the term "client," "user," and other appropriate terminology may be used interchangeably as appropriate without departing from the scope of this disclosure. Moreover, this disclosure contemplates that many users may use one computer (302), or that one user may use multiple computers (302).

While the invention has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for monitoring point-of-safety stations in a process plant, comprising:
    disposing a wireless gateway device on a roof top of the process plant above a control room of a distributed control system (DCS) in the process plant;
    disposing a plurality of wireless field devices on the roof top to form a wireless mesh network;
    communicatively connecting the wireless gateway device to wired DCS equipment in the control room;
    communicatively connecting, using at least the wireless mesh network, the wireless gateway device to each of the point-of-safety stations;
    wirelessly transmitting, via the wireless mesh network, a status signal from each of the point-of-safety stations to the wired DCS equipment; and
    performing, in response to the wired DCS equipment receiving the status signal, a corrective action to enhance safety of the process plant, and
    wherein communicatively connecting the wireless gateway device to each of the point-of-safety stations is further using a 2-pair cable to connect a discrete transmitter of the plurality of wireless field devices to a station controller of a corresponding point-of-safety station, and
    wherein the discrete transmitter is disposed on the roof top above the corresponding point-of-safety station.

2. The method according to claim 1,
wherein the wireless gateway device is communicatively connected to the wired DCS equipment based on a Modbus data communications protocol.

3. The method according to claim 1,
wherein each of the plurality of wireless field devices communicate with each other based on a Highway Addressable Remote Transducer (HART) communication protocol.

4. The method according to claim 1,
wherein the station controller comprises a proximity switch to detect a person within a pre-determined range of the point-of-safety station,
wherein the 2-pair cable connects the discrete transmitter to a corresponding proximity switch,
wherein the status signal represents an on/off status of the proximity switch, and
wherein the discrete transmitter converts the on/off status of the proximity switch into the status signal in a wireless format.

5. The method according to claim 4,
wherein the point-of-safety station comprises an eyewash and a shower,
wherein the proximity switch activates, in response to detecting the person within the pre-determined range of the point-of-safety station, the eyewash and the shower to rinse off dangerous material from the person in an emergency incidence.

6. The method according to claim 5,
wherein the corrective action is performed to mitigate the emergency incidence.

7. The method according to claim 1,
wherein forming the wireless mesh network comprises assigning a network ID and joint key to each of the plurality of wireless field devices.

8. The method according to claim 7, wherein forming the wireless mesh network further comprises:
authenticating the plurality of wireless field devices to exclude any rogue device from the wireless mesh network, and
creating an access control list for the wireless gateway device.

9. The method according to claim 7, wherein forming the wireless mesh network further comprises:
providing, by the wireless gateway device, on demand or automatic key rotation for the plurality of wireless field devices.

10. A system for monitoring point-of-safety stations in a process plant, comprising:
a wireless gateway device disposed on a roof top of the process plant above a control room of a distributed control system (DCS) in the process plant;
a plurality of wireless field devices disposed on the roof top to form a wireless mesh network;
a wired DCS equipment in the control room and communicatively connected to the wireless gateway device; and
the point-of-safety stations that are communicatively connected using at least the wireless mesh network to the wireless gateway device,
wherein each of the point-of-safety stations wirelessly transmits, via the wireless mesh network, a status signal to the wired DCS equipment,
wherein the wired DCS equipment facilitates performing, in response to receiving the status signal, a corrective action to enhance safety of the process plant, and
wherein communicatively connecting the wireless gateway device to each of the point-of-safety stations is further using a 2-pair cable to connect a discrete transmitter of the plurality of wireless field devices to a station controller of a corresponding point-of-safety station,
wherein the discrete transmitter is disposed on the roof top above the corresponding point-of-safety station.

11. The system according to claim 10,
wherein the wireless gateway device is communicatively connected to the wired DCS equipment based on a Modbus data communications protocol.

12. The system according to claim 10,
wherein each of the plurality of wireless field devices communicate with each other based on a Highway Addressable Remote Transducer (HART) communication protocol.

13. The system according to claim 10,
wherein the station controller comprises a proximity switch to detect a person within a pre-determined range of the point-of-safety station,
wherein the 2-pair cable connects the discrete transmitter to a corresponding proximity switch,
wherein the status signal represents an on/off status of the proximity switch, and
wherein the discrete transmitter converts the on/off status of the proximity switch into the status signal in a wireless format.

14. The system according to claim 13,
wherein the point-of-safety station comprises an eyewash and a shower,
wherein the proximity switch activates, in response to detecting the person within the pre-determined range of the point-of-safety station, the eyewash and the shower to rinse off dangerous material from the person in an emergency incidence.

15. The system according to claim 14,
wherein the corrective action is performed to mitigate the emergency incidence.

16. The system according to claim 10,
wherein forming the wireless mesh network comprises assigning a network ID and joint key to each of the plurality of wireless field devices.

17. The system according to claim 16, wherein forming the wireless mesh network further comprises:
authenticating the plurality of wireless field devices to exclude any rogue device from the wireless mesh network, and
creating an access control list for the wireless gateway device.

18. The system according to claim 16, wherein forming the wireless mesh network further comprises:
providing, by the wireless gateway device, on demand or automatic key rotation for the plurality of wireless field devices.

* * * * *